(12) United States Patent
Wilson

(10) Patent No.: US 6,629,717 B1
(45) Date of Patent: Oct. 7, 2003

(54) INTERIOR TRIM ATTACHMENT APPARATUS AND METHOD FOR A VEHICLE

(75) Inventor: Douglas J. Wilson, Ft. Gratiot, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/246,145

(22) Filed: Sep. 18, 2002

(51) Int. Cl.[7] .................................................. B60J 3/00
(52) U.S. Cl. ..................................................... 296/97.9
(58) Field of Search ....................... 296/97.9; 248/278.1

(56) References Cited

U.S. PATENT DOCUMENTS

| | | | |
|---|---|---|---|
| 4,529,157 A | | 7/1985 | Suman et al. |
| 4,913,484 A | | 4/1990 | Dowd et al. |
| 4,989,911 A | | 2/1991 | Van Order |
| 5,082,322 A | | 1/1992 | Cekander et al. |
| 5,236,240 A | * | 8/1993 | Burns et al. |
| 5,468,041 A | | 11/1995 | Viertel et al. |
| 5,499,854 A | | 3/1996 | Crotty, III et al. |
| 5,765,897 A | | 6/1998 | Snyder et al. |
| 5,857,728 A | | 1/1999 | Crotty, III |
| 5,975,617 A | | 11/1999 | Jacquemin et al. |
| 6,007,136 A | | 12/1999 | Zittwitz et al. |
| H1834 H | | 2/2000 | Wilson et al. |
| 6,068,323 A | | 5/2000 | Brown et al. |
| 6,176,660 B1 | | 1/2001 | Lewis et al. |
| 6,220,645 B1 | | 4/2001 | Jacquemin |
| 6,250,708 B1 | | 6/2001 | Kurachi |
| 6,322,126 B1 | | 11/2001 | Kraus |
| 6,484,987 B2 | * | 11/2002 | Weaver |
| 2002/0017800 A1 | | 2/2002 | Ichikawa et al. |

* cited by examiner

Primary Examiner—Stephen T. Gordon
Assistant Examiner—Scott Carpenter
(74) Attorney, Agent, or Firm—MacMillan, Sobanski & Todd, LLC

(57) ABSTRACT

A mount assembly and method are provided for securing a visor to a vehicle mounting surface. Initially, a vehicle mounting surface having an aperture formed therein is provided. A bracket assembly including a bracket having a first aperture, a pivot cavity formed therein, and a flexible leg attached are also provided. A pivot member has a bore formed therethrough and is pivotally mounted within the pivot cavity of the bracket. An arm is disposed within the bore of the pivot member. The arm is then moved in a first direction such that the pivot member pivots about the pivot axis until the pivot member is in a first position and the flexible leg is in an inwardly retracted position. The bracket assembly is then placed adjacent the mounting surface such that the flexible leg is inserted into the aperture in the mounting surface. The arm is then moved in a second direction such that the pivot member is caused to pivot about the pivot axis until the pivot member is in a second position and the flexible leg is in an outwardly extended position, the bracket thereby being secured to the mounting surface.

16 Claims, 6 Drawing Sheets

INTERIOR TRIM ATTACHMENT APPARATUS AND METHOD FOR A VEHICLE

BACKGROUND OF THE INVENTION

The present invention relates to attachment devices and more particularly to a mount assembly and method for securing a visor to a vehicle mounting surface.

When driving a vehicle it is desirable to shield an occupant's eyes from glaring sunlight which enters the vehicle interior through the windshield or the side windows. As a result, vehicle interiors are usually equipped with sun visors.

Visors typically include a visor body and a pivot rod assembly. The pivot rod assembly typically includes an L-shaped pivot rod, a torque control, and a means for mounting the rod to the vehicle roof and/or headliner. The torque control rotationally mounts the visor body to the pivot rod. The torque control allows the visor body to be moved between, and held at, various rotational positions with respect to the rod. This allows the visor to be moved between a lowered position adjacent the windshield or side window to a raised position adjacent the roof and/or headliner.

A number of methods have been proposed for mounting the pivot rods to the roof and/or headliner. One known method includes a mount attached to the roof and/or headliner by screws or barbed Christmas-tree type fasteners. However, screws can be difficult to install on a quickly moving assembly line since the power screw drivers often inadvertently disengage the screw head and irreparably mar the adjacent trim panel or bezel. This leads to poor quality or costly removal and scrapping of the expensive trim panel. Furthermore, insertion of multiple screws is time consuming. Moreover, the installed screws are typically considered to be unattractive and are sometimes hidden by caps, especially for luxury vehicles. Christmas tree type fasteners, on the other hand, are more aesthetically pleasing and easy to install but are typically not reusable once removed, and are not suitable for withstanding loads within moving parts.

Another known method of mounting includes a snap-in type mount. This type of mount includes a snap-fit connector inserted within a hole in the roof and/or headliner. Often, the pivot rod is attached to the mount prior to installation in the vehicle. However, snap-in mounts can be damaged or broken as the sun visor rod and mount are snapped into place. Such snap in mounts often can be removed with only a relatively small force, and are thereby not very stable. Therefore, it would be advantageous to provide an improved interior trim attachment apparatus for an automotive vehicle.

SUMMARY OF THE INVENTION

This invention relates to an improved mount assembly and method for securing a visor to a vehicle mounting surface. Initially, a vehicle mounting surface having an aperture formed therein is provided. A bracket assembly is also provided. The bracket assembly includes a bracket having a first aperture, a pivot cavity formed therein, and a flexible leg attached thereto. A pivot member is pivotally mounted about a pivot axis within the pivot cavity of the bracket, and has a bore formed therethrough. An arm is disposed within the bore of the pivot member. The pivot member engages the flexible leg. The flexible leg is movable between an inwardly retracted position when the pivot member is in a first position, and an outwardly extended position when the pivot member is in a second position. The arm is then moved in a first direction such that the pivot member is caused to pivot about the pivot axis until the pivot member is in the first position. The bracket assembly is then placed adjacent the mounting surface such that the flexible leg is inserted into the aperture in the mounting surface. The arm is then moved in a second direction such that the pivot member is caused to pivot about the pivot axis until the pivot member is in the second position, the bracket thereby being secured to the mounting surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
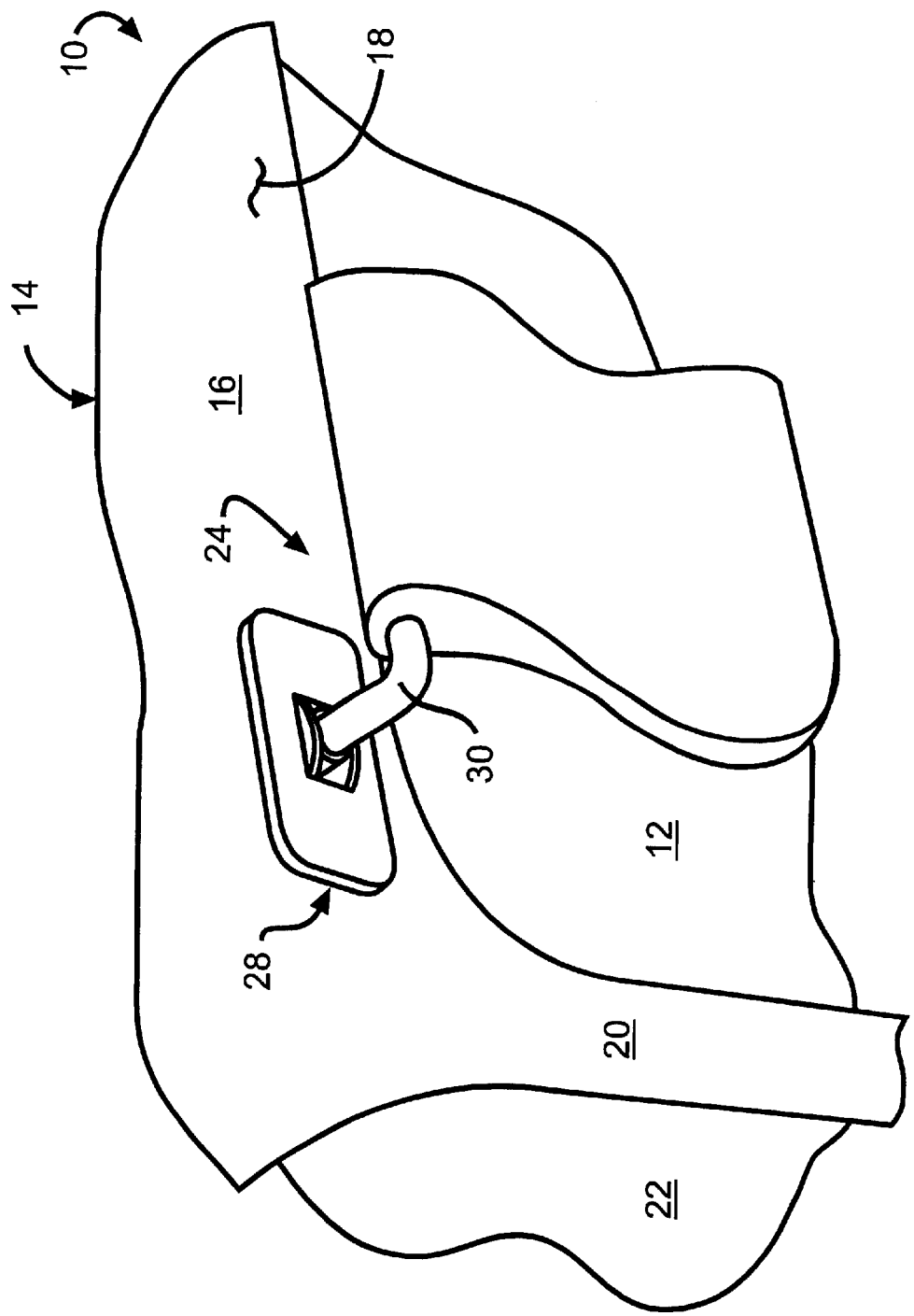
FIG. 1 is a fragmentary perspective view of a sun visor assembly according to the invention, as installed in a vehicle.

Referring to FIG. 1, a vehicle 10 includes a windshield 12 and a mounting surface or roof 14. Preferably, the roof 14 is formed of sheet metal, although such is not required. The roof 14 provides structural support for the vehicle interior, and is typically covered by a headliner 16 having an upholstered surface 18 to provide an aesthetically pleasing appearance to the vehicle.

The vehicle further includes a windshield pillar 20 separating the windshield 12 and a side window 22. A sun visor assembly 24 is shown on the driver's side of the vehicle. The sun visor assembly 24 includes a visor body 26, and a visor mount or bracket assembly 28.

Preferably, the visor body 26 includes a substrate formed from plastic, foam, or pressboard. The substrate can also be formed of any desired material. The substrate is preferably covered with cloth or vinyl. The sun visor assembly 24 preferably includes a visor arm 30 for mounting the visor body 26 to a mounting surface, such as the sheet metal of the vehicle roof 14, as will be described below, and a torque control (not shown). The torque control rotationally mounts the visor body 26 to the visor arm 30, and is preferably mounted within the visor body 26. The torque control can be any desired type of torque control that allows the visor body 26 to be moved between, and held at, various rotational positions with respect to the visor arm 30. The torque control allows the visor body 26 to be moved between a lowered position substantially adjacent the windshield 12 or side window 20, and a raised position substantially adjacent the roof 14 and/or headliner 16. The visor arm 30 can also rotate with the visor body 26 from the position substantially adjacent the windshield 12, to the position substantially adjacent the side window 20.

Figure 2:
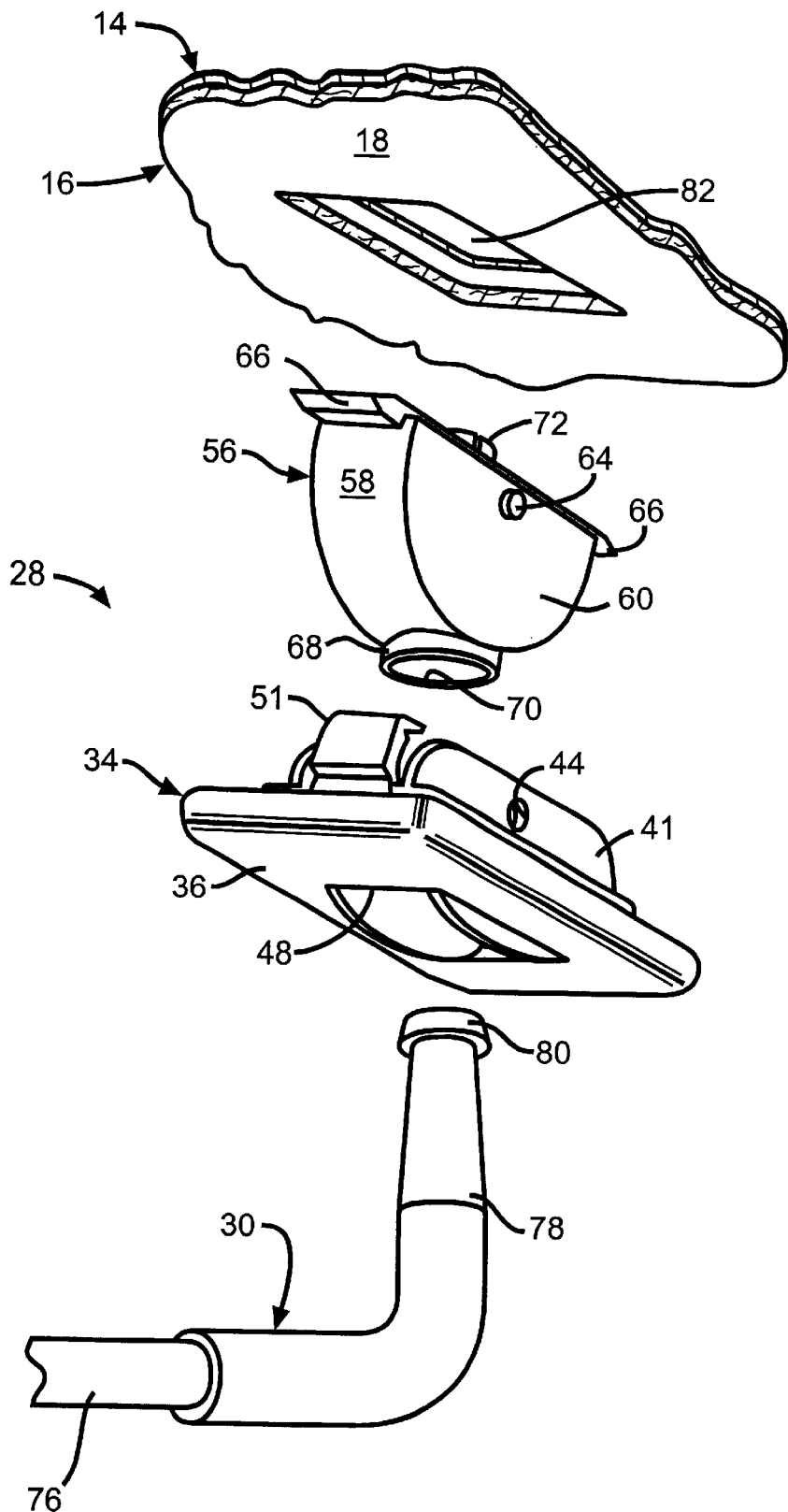
FIG. 2 is an enlarged exploded perspective view of the bracket mount assembly illustrated in FIG. 1.
Figure 3:
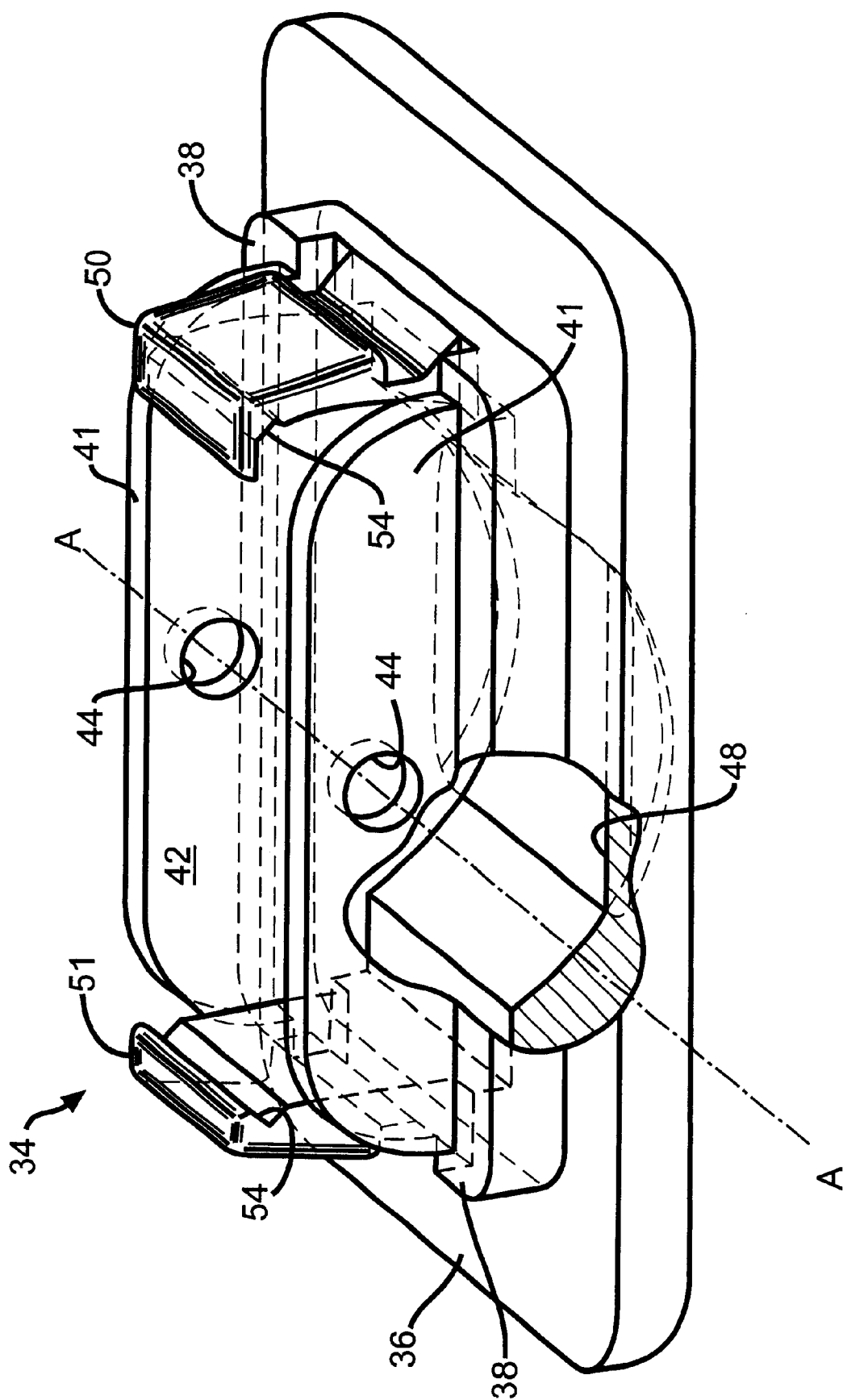
FIG. 3 is a fragmentary perspective view of the bracket illustrated in FIG. 2.
Figure 5:
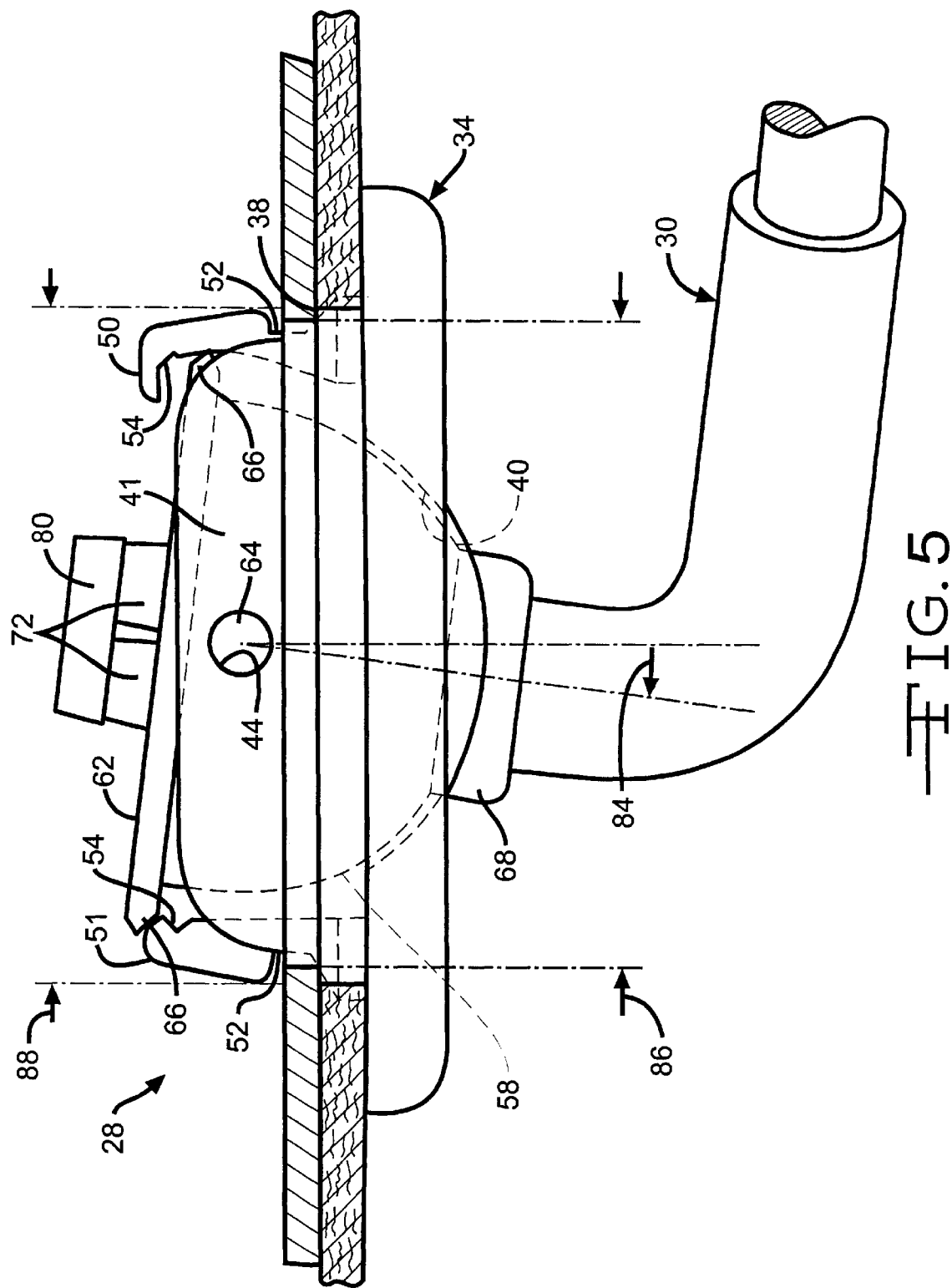
FIG. 5 is an elevational view of the visor bracket assembly illustrated in FIG. 2 showing the flexible legs in the inwardly retracted position.
Figure 6:
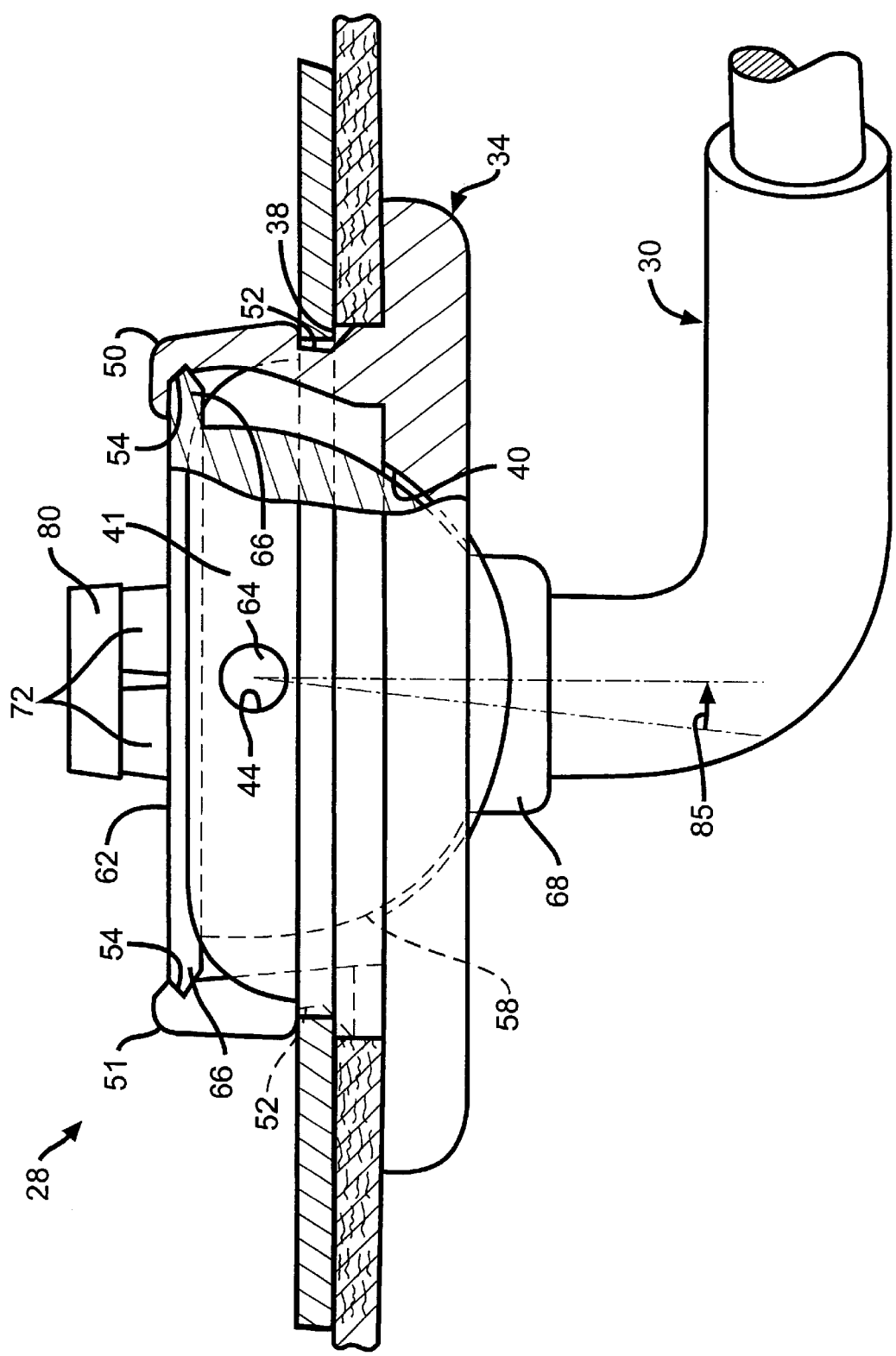
FIG. 6 is an elevational view, partially in cross section, of the visor bracket assembly illustrated in FIG. 2 showing the flexible legs in the outwardly extended position.

As best shown in FIGS. 2 and 3, the visor bracket assembly 28 includes a bracket 34. Preferably the bracket 34 includes a molded plastic bracket body 36. The bracket body 36 illustrated has a substantially rectangular shape, although such is not required. The bracket body can have any desired shape, such an oval shape. The bracket body 36 includes an upper or roof-contacting surface 38. The roof-contacting surface defines a substantially arcuate inner surface 40. Preferably, the surface 40 has a semi-circular cross sectional shape, as shown in FIGS. 5 and 6, although such is not required. Substantially parallel side walls 41 extend upwardly, as viewed in FIG. 3, from the roof-contacting surface 38. The side walls 41 define substantially parallel side surfaces 42. A pivot aperture 44 is formed in each side wall 41. Each pivot aperture 44 is centered on a pivot axis A. The arcuate surface 40 and the side surfaces 42 define a pivot cavity 46. A substantially rectangular first aperture 48 is centrally formed in a lower portion of the arcuate surface 40.

Substantially flexible legs 50 and 51 extend upwardly, as viewed in FIGS. 3, 5, and 6, from the roof-contacting surface 38 at opposite ends of the side walls 41. Each flexible leg 50 and 51 includes an outwardly facing groove 52 and an inwardly facing groove 54 formed on upper and lower portions, respectively, of legs 50 and 51. The outwardly facing groove 52 engages the roof 14 and the inwardly facing groove 54 engages a pivot member 56, as will be explained in detail herein.

Figure 4:
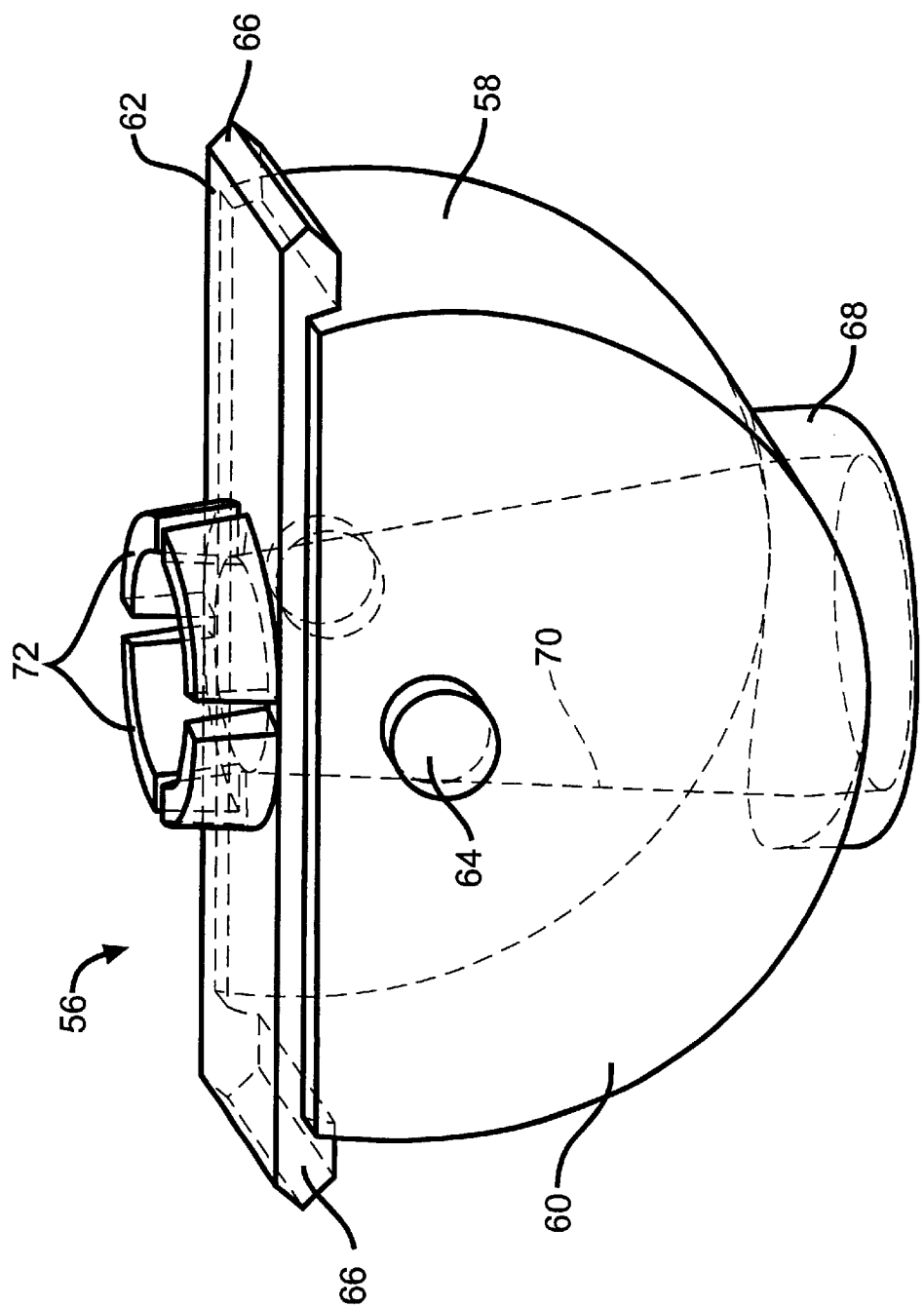
FIG. 4 is a perspective view of the pivot member illustrated in FIG. 2.

Referring now to FIGS. 2 and 4, a pivot member 56 includes a substantially semi-circular first outer surface 58, although such is not required. The first outer surface 58 can be any desired shape such that the pivot member 56 can pivot within the pivot cavity 46, as described herein. The pivot member 56 further includes opposing side pivot surfaces 60, and a substantially flat second outer surface 62. Outwardly extending pivot pins 64 are preferably formed on the side pivot surfaces 60. Outwardly extending first locking tangs 66 are formed at opposite ends of the second outer surface 62. A substantially cylindrical collar 68 is formed at a lower portion, as viewed in FIG. 4, of the first outer surface 58. A bore 70 is formed through pivot member 56, from the collar 68 to the second outer surface 62. A plurality of circularly arranged, resilient second locking tangs 72 extend outwardly from the second outer surface 62 about the bore 70. Preferably, the bore 70 is tapered, although such is not required.

As shown in FIG. 2, the visor bracket assembly 28 further includes visor arm 30 disposed within the bore 70 of the pivot member 56. The visor arm 30 is substantially L-shaped and includes a substantially cylindrical first portion 76, a second portion 78, and a head 80. Preferably, the second portion 78 has a tapered shape which corresponds to the taper of the bore 70.

Assembly and installation of the visor assembly 24 will now be discussed with reference to FIGS. 2, 5, and 6. Prior to installation of the sun visor assembly 24 into a vehicle roof, the bracket 34, pivot member 56, and visor arm 30, are assembled to form the bracket assembly 28. To assemble the bracket assembly 28, the pivot member 56 is first pivotally mounted within the pivot cavity 46 by inserting the pivot member 56 within the pivot cavity 46, and inserting the pivot pins 64 within the pivot apertures 44. Preferably, the side walls 41 are resilient and outwardly expandable such that the pivot member 56 can be snapped into the pivot cavity 46. The visor arm 30 can then be disposed within the bore 70. Preferably, the visor arm 30 is retained within the bore 70 by the resilient second locking tangs 72. Specifically, when the visor arm 30 is axially introduced into the bore 70, the tangs 72 are caused to radially expand and then retract below the head 80, whereat the tangs 72 engage the underside of the head 80.

As shown by arrow 84 in FIG. 5, lateral movement of the arm 30 in a first direction causes the pivot member 56 pivot (clockwise as viewed in FIG. 5) relative to the bracket 34. Preferably, the pivot member 56 can be moved to a first position wherein the flexible legs 50 and 51 are in an inwardly retracted position, as shown in FIG. 5. In the first position, one of the first locking tangs 66 is in contact with a flexible leg 50 below the inwardly facing groove 54. Additionally, in the first position, the other first locking tang 66 is slightly above, and thereby not in contact with flexible leg 51.

As shown by arrow 85 in FIG. 6, lateral movement of the arm 30 in a second direction, opposite the first direction, causes the pivot member 56 pivot (counter-clockwise as viewed in FIG. 6) relative to the bracket 34. Preferably, the pivot member 56 can be moved to a second position wherein the flexible legs 50 and 51 are in an outwardly extended position, as shown in FIG. 6.

Referring to FIG. 5, the bracket assembly 28 can then be mounted into an aperture 82 in the vehicle roof 14. Preferably, the roof aperture 82 has a length 86 slightly smaller than a length 88 between the outer surfaces of the legs 50 and 51 when the bracket assembly 28 is in the inwardly retracted position, as shown in FIG. 5. First, the pivot member 56 is moved to the first position, as shown in FIG. 5. Then, the side walls 41 and flexible legs 50 and 51 are inserted within an aperture 82 in the roof 14 such that the roof-contacting surface 38 is adjacent the roof 14. Preferably, the flexible legs 50 and 51 are resilient such that they can be flexed inwardly, thereby allowing the legs 50 and 51 to be snapped into the pivot cavity 46. Alternately, the bracket assembly 28 can be inserted into the roof aperture 82 in a substantially rocking motion. In such a rocking motion, one of the legs 50 and 51 is first inserted into the roof aperture 82, such that the sheet metal of the roof 14 is in the groove 52. The opposite leg is then rotated upwardly until the roof-contacting surface 38 contacts the roof 14.

The arm 30 is then moved laterally such that the pivot member 56 is caused pivot (counter clockwise as viewed in FIG. 5), thereby moving to the second position. In the second position, the first locking tangs 66 are seated within the inwardly facing grooves 54, as shown in FIG. 6. Additionally, in the- second position, the first locking tangs 66 of the pivot member 56 urge the flexible legs 50 and 51 of the bracket 34 outwardly and downwardly, locking the sheet metal of the roof 14 between the roof-contacting surface 38 and the flexible legs 50.

The visor assembly 24 can be removed from the vehicle after installation by moving the arm 30 laterally with sufficient force so as to disengage the first locking tangs 66 for the pivot member 56 from the grooves 54, and moving the pivot member 56 to the first position, as shown in FIG. 5. The bracket assembly 28 can then be removed from the aperture 82.

The headliner 16 can be the modular type (not shown), wherein a plurality of headliner accessories, such as the sun visor assembly 24, are attached to the roof 14 and headliner 16 before the headliner 16 is installed in the vehicle 10. It will be appreciated that the visor bracket assembly 28 provides a simple design which is easy to assemble and pre-install in a modular type headliner. Additionally, it will be appreciated that the sun visor assembly 24 can also be quickly and efficiently installed in a vehicle after installation of the headliner.

The principle and mode of operation of this invention have been described in its preferred embodiment. However, it should be noted that this invention may be practiced otherwise than as specifically illustrated and described without departing from its scope. For example, modifications to the invention can include, but are not limited to, modifying the shape of the bracket, and pivot member and corresponding pivot cavity. In addition, the bracket assembly can be used to secure other interior components in a vehicle. For example, the bracket assembly can be used to attach components to a door panel.

What is claimed is:

1. A mount assembly for securing a visor to a vehicle mounting surface, said mount assembly comprising:

a bracket having a first aperture, a pivot cavity being formed therein;

a flexible leg attached to said bracket, said flexible leg for insertion into a second aperture in said mounting surface;

a pivot member pivotally mounted about a pivot axis within said pivot cavity of said bracket, said pivot member having a bore formed therethrough; and an arm disposed within said bore of said pivot member, wherein lateral movement of said arm causes said pivot member to pivot about said pivot axis, thereby causing the pivot member to engage said flexible leg causing said flexible leg to engage said mounting surface, thereby securing said bracket to said mounting surface.

2. The mount assembly according to claim 1, said bracket having a substantially arcuate inner bottom surface, and substantially parallel inner side surfaces, said inner bottom surface and said inner side surfaces defining said pivot cavity.

3. The mount assembly according to claim 2, said flexible leg including an outwardly facing groove for engaging said mounting surface.

4. The mount assembly according to claim 3, said flexible leg further including and an inwardly facing groove.

5. The mount assembly according to claim 4, said bracket further including a second flexible leg, said second flexible leg including an outwardly facing groove for engaging said mounting surface and an inwardly facing groove.

6. The mount assembly according to claim 1, said pivot member including a substantially semi-circular first outer surface and opposing side surfaces.

7. The mount assembly according to claim 6, each of said opposing side surfaces of said pivot member further including an outwardly extending pivot pin, said pivot pins pivotally mounting said pivot member within said pivot cavity of said bracket.

8. The mount assembly according to claim 7, each of said side surfaces of said bracket including a pivot aperture for receiving said pivot pins of said pivot member.

9. The mount assembly according to claim 1, wherein said bore is substantially tapered.

10. The mount assembly according to claim 4, said pivot member further including an outwardly extending tang, said tang for engaging said inwardly facing groove of said flexible leg.

11. The mount assembly according to claim 1, wherein said arm is a visor arm.

12. The mount assembly according to claim 9, said arm including a substantially tapered portion for engagement with said bore.

13. A mount assembly for securing a component to a mounting surface, said mount assembly comprising:

a bracket having a pivot cavity formed therein;

a plurality of flexible legs attached to said bracket, said flexible legs for insertion into a first aperture in said mounting surface;

a pivot member pivotally mounted about a pivot axis within said pivot cavity of said bracket, said pivot member having a bore formed therethrough; and an arm disposed within said bore of said pivot member, wherein lateral movement of said arm causes said pivot member to pivot about said pivot axis, thereby causing the pivot member to engage said flexible legs causing said flexible legs to engage said mounting surface, thereby securing said bracket to said mounting surface.

14. The mount assembly according to claim 13, each of said flexible legs including an outwardly facing groove for engaging said mounting surface, and an inwardly facing groove.

15. The mount assembly according to claim 14, said pivot member further including an outwardly extending tangs, said tangs for engaging said inwardly facing grooves of said flexible legs.

16. The mount assembly according to claim 13, wherein said arm is a visor arm.

\* \* \* \* \*